United States Patent
Moore et al.

(10) Patent No.: US 10,646,931 B2
(45) Date of Patent: May 12, 2020

(54) DRILL ATTACHMENT HAVING AN ADAPTER COMPONENT

(71) Applicant: BACKSAVER 2005, LLC, Granite City, IL (US)

(72) Inventors: Bruce Moore, Granite City, IL (US); Shannon L. Howland, Granite City, IL (US)

(73) Assignee: Backsaver 2005, LLC, Granite City, IL (US)

( * ) Notice: Subject to any disclaimer, the term of this patent is extended or adjusted under 35 U.S.C. 154(b) by 453 days.

(21) Appl. No.: 15/333,366

(22) Filed: Oct. 25, 2016

(65) Prior Publication Data
US 2018/0111203 A1    Apr. 26, 2018

(51) Int. Cl.
| B23B 45/00 | (2006.01) |
| B25H 1/00 | (2006.01) |
| B25D 17/28 | (2006.01) |

(52) U.S. Cl.
CPC ............ *B23B 45/003* (2013.01); *B25D 17/28* (2013.01); *B25H 1/0021* (2013.01); *B25D 2250/005* (2013.01); *B25D 2250/255* (2013.01)

(58) Field of Classification Search
CPC ...... B23B 45/003; B25D 17/28; B25D 17/04; B25D 2250/255; B25D 2250/005; B25D 17/043; B25H 1/0021; B01F 7/00725; B25F 5/00; B25F 5/02; B25F 5/021; B25F 3/00
See application file for complete search history.

(56) References Cited

U.S. PATENT DOCUMENTS

| 2,405,110 | A | * | 8/1946 | Bullock | ............... | B25H 1/0035 173/141 |
| 2,947,204 | A | * | 8/1960 | Pine | .................... | B25H 1/0035 173/141 |
| 3,359,032 | A |  | 12/1967 | Kochanowski |  |  |

(Continued)

OTHER PUBLICATIONS

Extended European Search Report issued in corresponding European Application No. 17185517.4 dated Mar. 22, 2018, 6 pages.

*Primary Examiner* — Chelsea E Stinson
*Assistant Examiner* — Thomas M Wittenschlaeger
(74) *Attorney, Agent, or Firm* — Polsinelli PC

(57) ABSTRACT

A drill attachment for engagement and actuation of a drill apparatus having a bifurcated frame defining a first shaft and a second shaft operatively engaged to the drill apparatus at first and second engagement points is disclosed. A handle is pivotally engaged to the first shaft and is operatively coupled to a trigger actuator located along the first shaft through a trigger cable operatively engaged to a trigger actuator the distal end of the first shat that permits remote actuation of the drill apparatus. The trigger actuator includes a pivotable rocking arm having an actuator pad in selective engagement with the drill trigger such that actuation of the handle by the user pivots the rocking arm in a manner that causes the actuator pad to engage or disengage the drill trigger when operating the drill apparatus. The drill attachment is operatively engaged to the drill apparatus through an adapter component having a proximal portion engaged to the drill attachment and a distal portion defining a generally curved configuration adapted to engage the handle of any conventional drill apparatus.

14 Claims, 19 Drawing Sheets

(56) References Cited

U.S. PATENT DOCUMENTS

| | | | |
|---|---|---|---|
| 3,552,239 A * | 1/1971 | Yeaman et al. | B25H 1/0057 408/103 |
| 3,949,817 A | 4/1976 | Rice | |
| 3,985,188 A | 12/1976 | Steele | |
| 4,145,810 A * | 3/1979 | Belliston | A01G 3/053 30/296.1 |
| 4,153,193 A | 5/1979 | Urbanowicz | |
| 4,339,065 A | 7/1982 | Haytayan | |
| 4,359,822 A * | 11/1982 | Kolodziejczyk | B27B 17/0008 173/170 |
| 4,479,599 A | 10/1984 | Conrad | |
| 5,129,467 A | 7/1992 | Watanabe et al. | |
| 5,199,625 A | 4/1993 | Dewey et al. | |
| 5,361,851 A * | 11/1994 | Fox | B25F 5/021 173/170 |
| 5,546,749 A * | 8/1996 | Couchee | B25G 1/04 16/421 |
| 5,598,892 A * | 2/1997 | Fox | B25F 5/021 173/170 |
| 5,820,317 A * | 10/1998 | Van Troba | B25H 1/0035 408/136 |
| 7,144,206 B2 | 12/2006 | Burger et al. | |
| D538,126 S | 3/2007 | Aglassinger | |
| 7,204,321 B2 | 4/2007 | Agehara et al. | |
| 7,228,917 B2 | 6/2007 | Davis et al. | |
| 7,237,707 B1 * | 7/2007 | Wakelin | B25C 7/00 173/170 |
| 7,258,261 B1 * | 8/2007 | Reyes | B25C 7/00 173/170 |
| 7,617,885 B2 * | 11/2009 | Howland | B25F 5/00 173/1 |
| 9,878,439 B2 * | 1/2018 | May | B25H 1/0035 |
| 9,999,969 B1 * | 6/2018 | Walter | B25F 3/00 |
| 2016/0303730 A1 * | 10/2016 | Carvajal | B25B 23/0071 |

* cited by examiner

DRILL ATTACHMENT HAVING AN ADAPTER COMPONENT

FIELD

The present disclosure generally relates to drill attachments, and more particularly to drill attachments having an adapter component for operatively engaging the drill attachment to a drill apparatus.

BACKGROUND

Drill apparatuses, such as hammer drills, are commonly used to drill holes in concrete and other materials during construction activity. In one particular use, a hammer drill may be used to drill holes along an end of a concrete slab by laying the hammer drill on the floor adjacent the concrete slab, abutting the hammer drill to the concrete slab, and drilling a sequence of holes along the end of the concrete slab while maintaining an abutting relationship between the concrete slab and the hammer drill. However, the process of drilling holes with a hammer drill in this manner can be physically exhausting and uncomfortable since the user must sit or kneel down for long periods of time while handling the hammer drill in a manner that ensures that the hammer drill is maintained in the proper orientation during operation. To solve this issue, U.S. Pat. No. 7,617,885 to Shannon L. Howland discloses a drill attachment that is operable to secure and operate a conventional drill apparatus. In particular, the drill attachment of Howland requires that the drilling apparatus have the appropriate engagement points to allow the drill attachment to establish a secure and operative engagement between the drill attachment and the drill apparatus. However, drill apparatuses are manufactured by different manufacturers, thereby making it difficult to properly engage the drill attachment to different types of drill apparatuses if the drill attachment lacks both engagement points. Accordingly, a drill attachment is needed that allows the drill attachment to be attached to different types of drill apparatuses regardless of configuration of the drill apparatus.

BRIEF DESCRIPTION OF THE DRAWINGS

Corresponding reference characters indicate corresponding elements among the view of the drawings. The headings used in the figures should not be interpreted to limit the scope of the claims.

DETAILED DESCRIPTION

Figure 1:
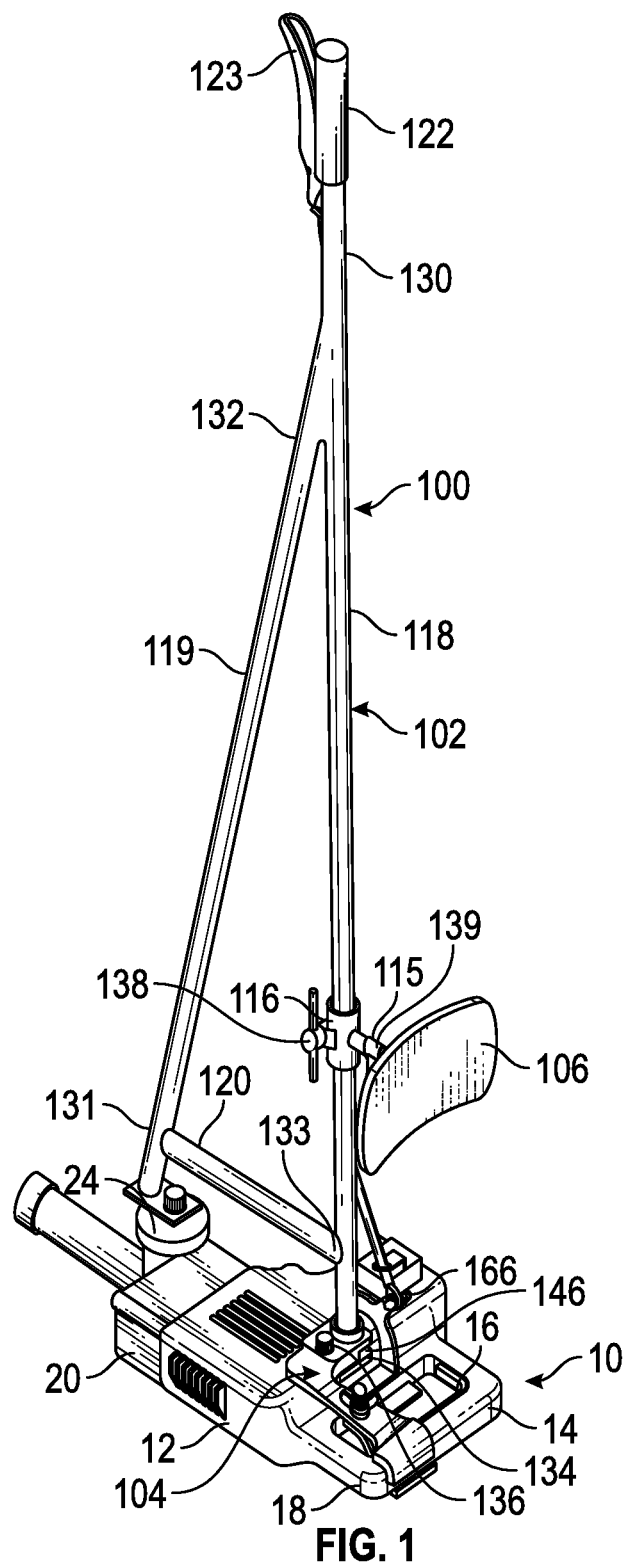
FIG. 1 is a perspective view of a drill attachment operatively engaged to a drill apparatus, according to aspects of the present disclosure.
Figure 2:
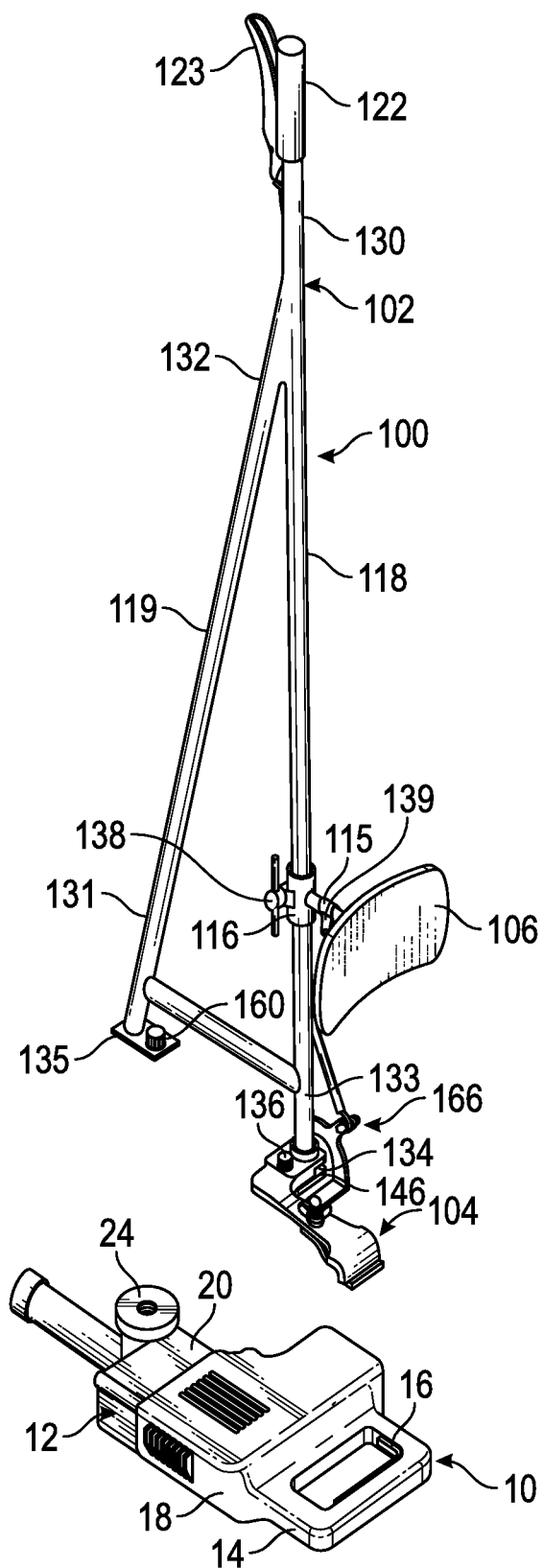
FIG. 2 is an exploded view of the drill attachment and drill apparatus of FIG. 1, according to aspects of the present disclosure.

Various embodiments of a drill attachment that may be secured to a drill apparatus so that a user may operate the drill apparatus through the drill attachment while in a substantially upright position are disclosed. In some embodiments, the drill attachment includes an adapter component that allows the drill attachment to be operatively engaged to different types of drill apparatuses regardless of configuration. In some embodiments, the adapter component includes an upper clamp member coupled to a lower clamp member configured to engage a handle of the drill apparatus to permit remote actuation of the drill apparatus trigger through actuation of a trigger actuator of the drill attachment. In some embodiments, the adapter component includes a distal portion having a curved shape configured to engage around the handle of the drill apparatus to also permit remote actuation of the drill apparatus trigger through actuation of a trigger actuator of the drill attachment. Referring to the drawings, embodiments of the drill attachment is illustrated and generally indicated as 100 and 200 in FIGS. 1-28.

As shown in FIG. 1, a first embodiment of the drill attachment, designated 100, may be adapted to be operatively engaged to a drill apparatus 10 having a body 12 defining a proximal portion 18 forming a handle 14 and a distal portion 20 forming an engagement point 24. The engagement point 24 formed by the body 12 of the drill apparatus 10 allows the drill apparatus 10 to be engaged to a first portion of the drill attachment 100. In some embodiments the engagement point 24 defines a threaded hole defined through the body 12 of the drill apparatus 10 which is adapted for use in engaging a removable lateral handle (not shown) used by an individual in directly handling the drill apparatus 10 when not engaged to the drill attachment 100. In some embodiments, the handle 14 includes a drill trigger 16 that may be actuated by the drill attachment 100 such that the user does not have to directly actuate the drill trigger 16 to operate the drill apparatus 10. In some embodiments, the handle 14 is configured for engagement with an adapter component 104 for coupling a second portion of the drill attachment 100 to the drill apparatus 10 regardless of the configuration of the handle 14. In one embodiment, the drill apparatus 10 may be any type of conventional drill apparatus 10, such as a hammer drill.

Referring to FIGS. 1-8, the drill attachment 100 may include a bifurcated frame 102 having an elongated, hollow tubular first shaft 118 and an elongated, hollow tubular second shaft 119. As shown, the first shaft 118 defines a proximal shaft portion 130 adapted for handling and actuating the drill attachment 100 and a distal shaft portion 131 configured for physically coupling the adapter component 104 to the handle 14 of the drill apparatus 10 when securing the drill attachment 100 to the drill apparatus 10 as shall be described in greater detail below. In one embodiment, the proximal shaft portion 130 of the first shaft 118 may include a grip 122 made of plastic or rubber material adapted for handling by the individual when operating the drill attachment 100.

As further shown, the second shaft 119 defines a proximal shaft portion 132 that extends from the proximal shaft portion 130 of the first shaft 118 at a set angle relative to the first shaft 118. In addition, the second shaft 119 defines a distal shaft portion 133 adapted to engage and secure the drill attachment 100 to the engagement point 24 formed along the drill apparatus 10. In addition, a support shaft 120 may be laterally interposed between the first shaft 118 and second shaft 119 to provide structural support and reinforcement for the bifurcated frame 102. As noted above, the first shaft 118 and second shaft 119 are adapted to engage the drill attachment 100 to the distal portion 20 and proximal portion 18 of the drill apparatus 10, respectively.

Figure 7:
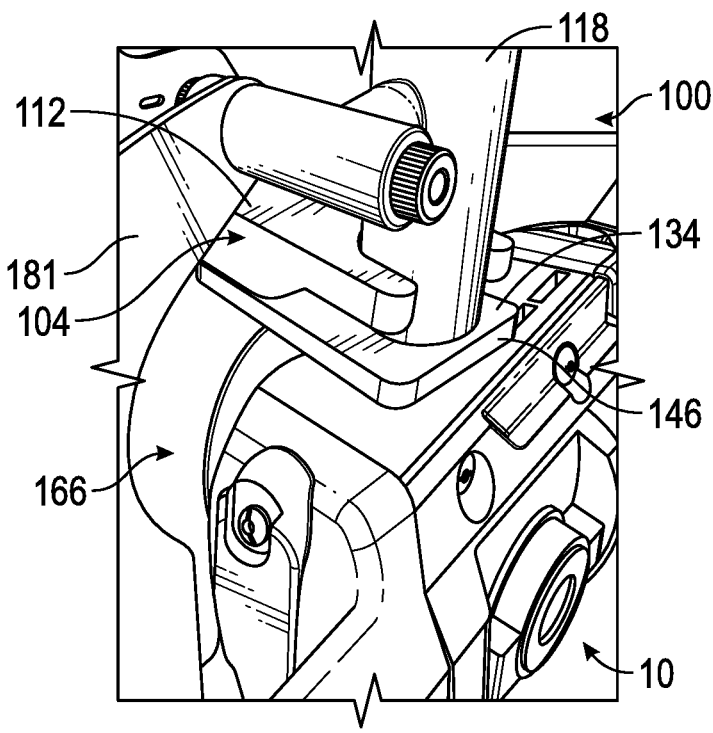
FIG. 7 is an enlarged view showing the engagement of an adapter component between the drill attachment and the drill apparatus, according to aspects of the present disclosure.

As shown in FIG. 7, in some embodiments the first shaft 118 of the drill attachment 100 may include a first base plate 134 configured to engage the adapter component 104 to the handle 14 of the drill apparatus 10 when engaging the drill attachment 100 to the drill apparatus 10. In particular, the first base plate 134 defines a planar surface 146 forming an aperture (not shown) configured to engage the adapter component 104 to the first shaft 118 of the bifurcated frame 102 using a securing member 136. In some embodiments, the securing member 136 may include a cap portion 156 and an axial rod portion 157. The cap portion 156 of the securing member 136 is configured for manual rotation by the user when coupling the first base plate 134 to the adapter component 104. The axial rod portion 157 of the securing member 136 defines external threads 158 (FIG. 3) configured to be inserted through the first base plate 134 and the adapter component 104 for coupling the adapter component 104 to the first shaft 118 of the drill attachment 100 as shall be described in greater detail below.

Referring to FIGS. 7-13, in some embodiments the adapter component 104 includes an upper clamp member 110 coupled to a lower clamp member 111 that collectively engage the handle 14 of the drill apparatus 10 proximate the drill trigger 16. As shown, the upper clamp member 110 defines an angled attachment portion 153 configured to engage an attachment member 112 which secures the adapter component 104 to the first shaft 118 of the drill attachment 100 as shown on FIGS. 7 and 8. The upper clamp member 110 further defines a middle portion 151 formed between the angled attachment portion 153 and a curved portion 152, which is defined at the free end of the upper clamp member 110.

Figure 8:
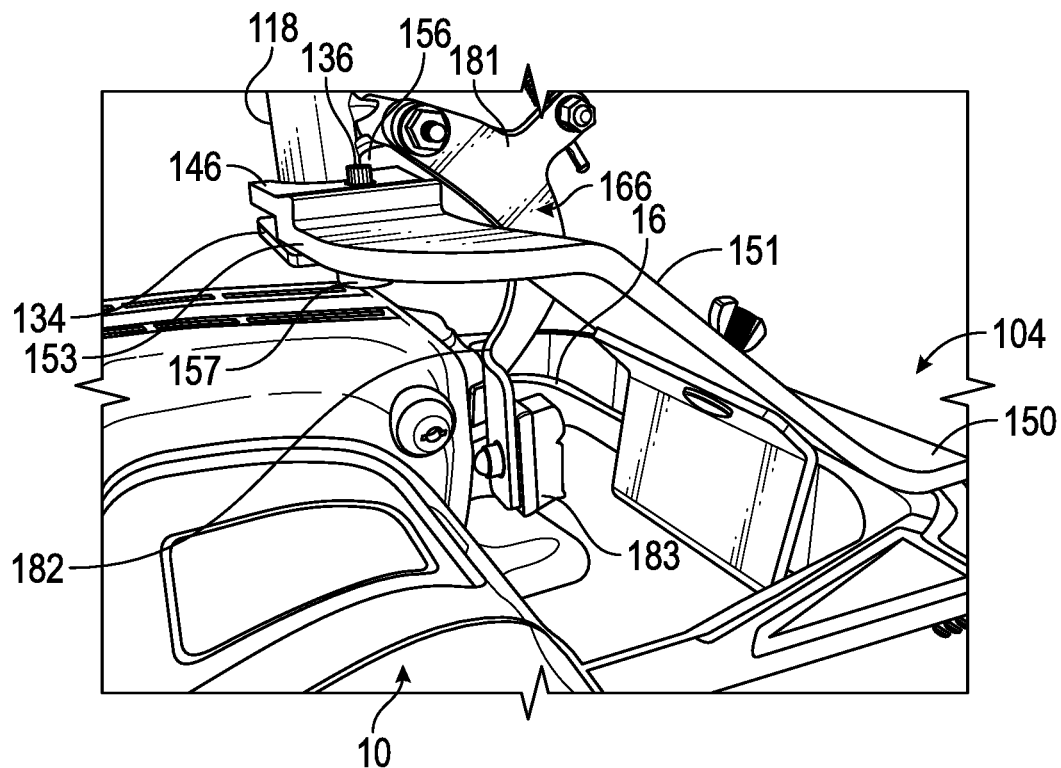
FIG. 8 is another enlarged view showing the engagement of the adapter component illustrated in FIG. 7, according to aspects of the present disclosure.
Figure 9:
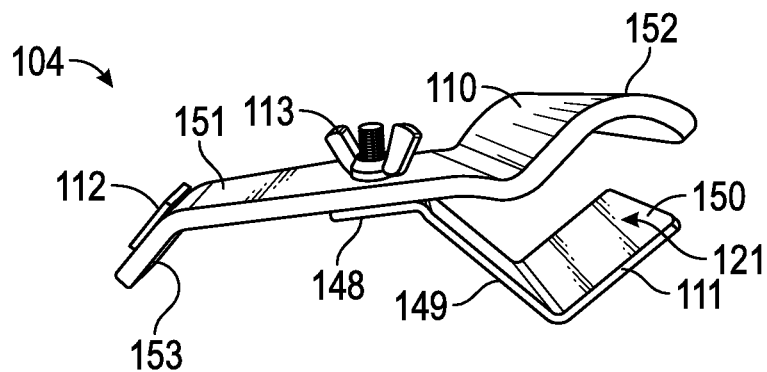
FIG. 9 is a perspective view of the adapter component used to engage the drill attachment to the drill apparatus, according to aspects of the present disclosure.
Figure 10:
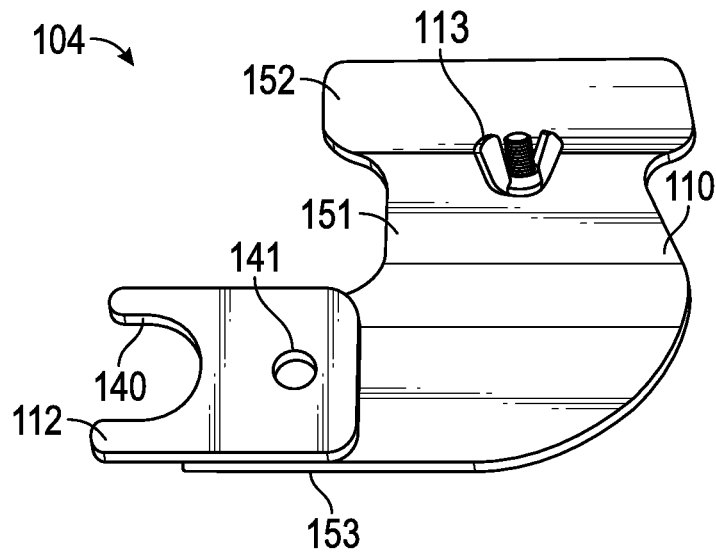
FIG. 10 is an end view of the adapter component of FIG. 9, according to aspects of the present disclosure.
Figure 11:
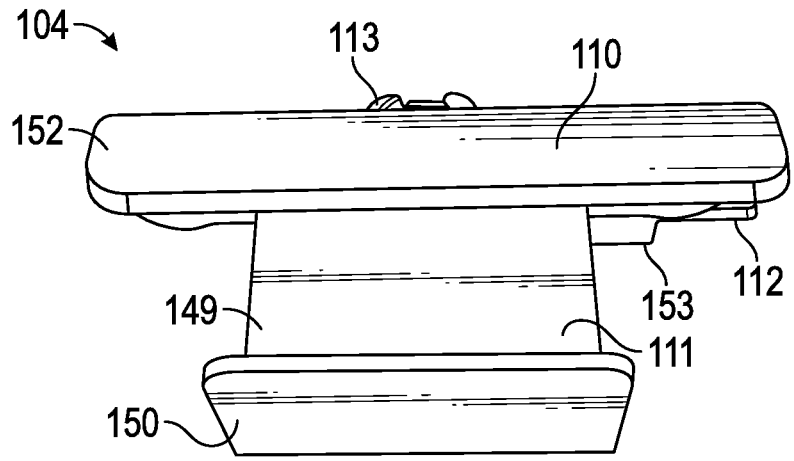
FIG. 11 is an opposite end view of the adapter component of FIG. 9, according to aspects of the present disclosure.
Figure 12:
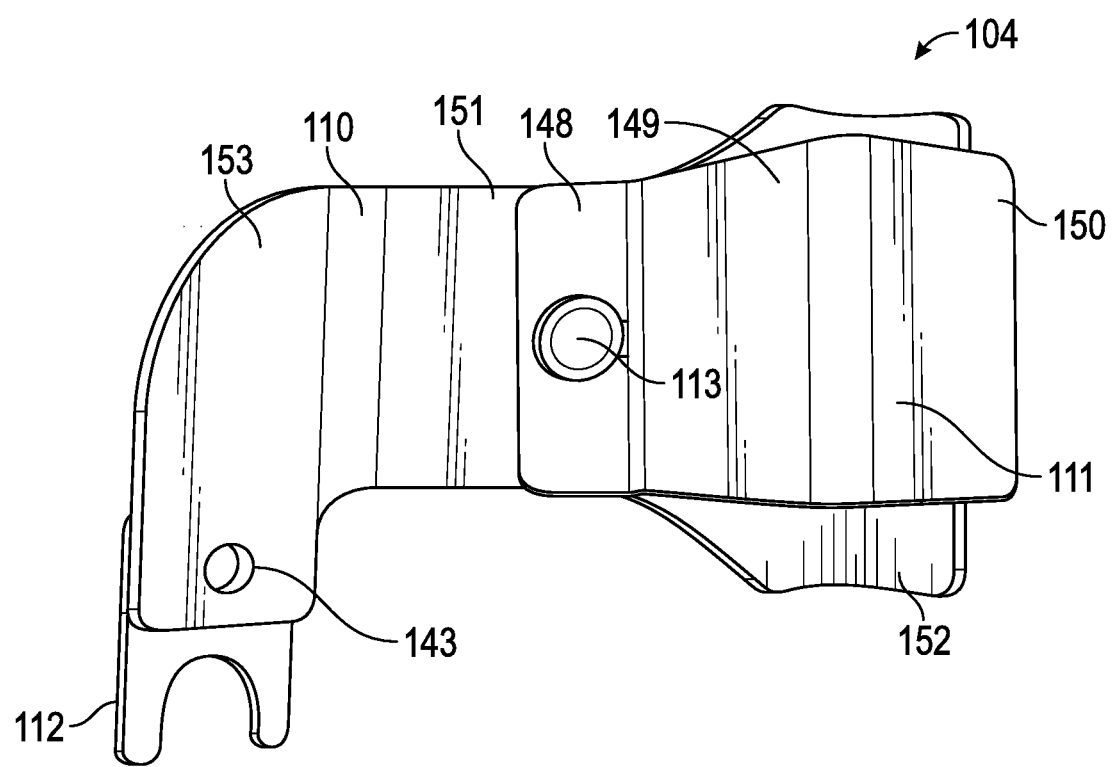
FIG. 12 is a top view of the adapter component of FIG. 9, according to aspects of the present disclosure.
Figure 13:
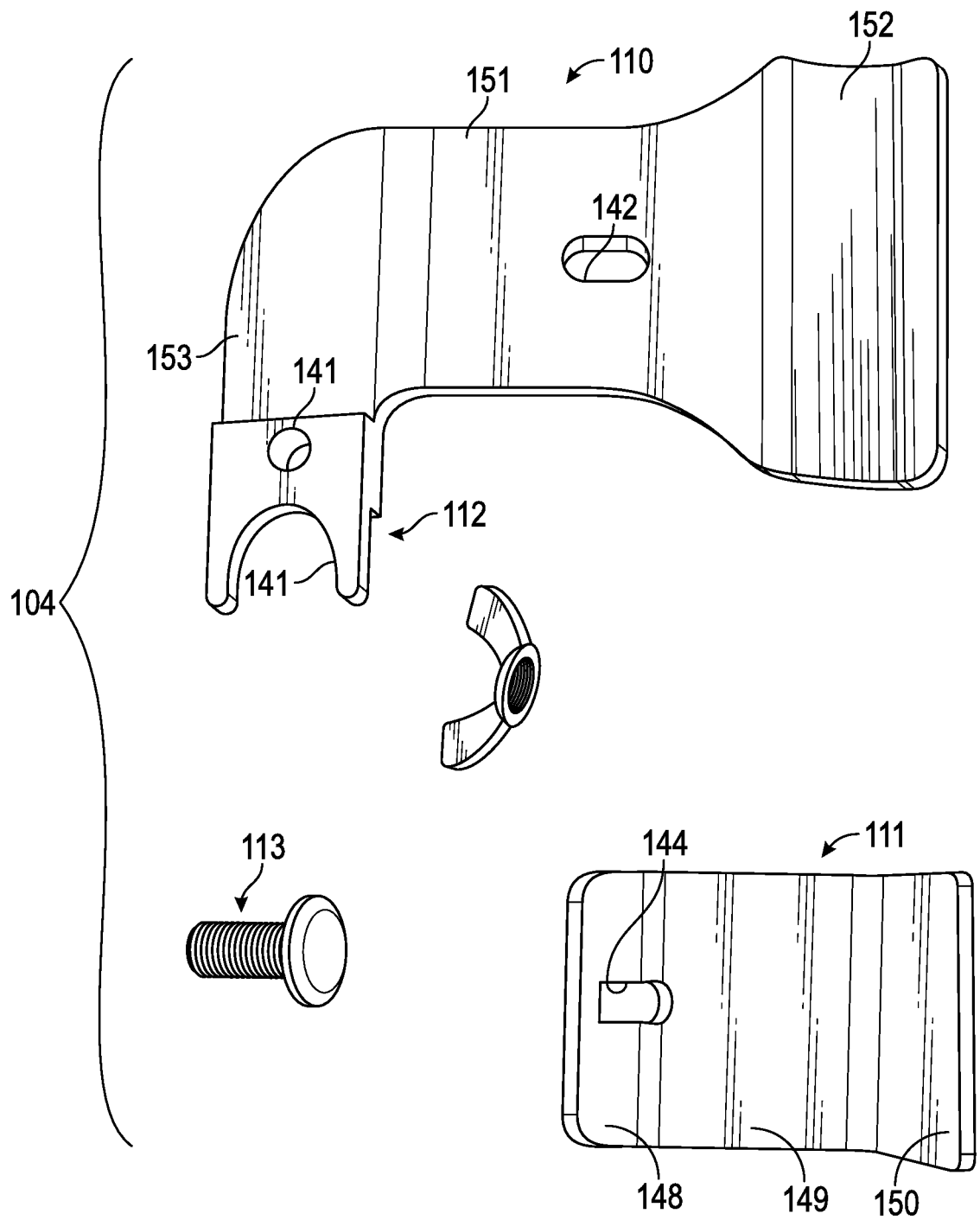
FIG. 13 is an exploded view of the adapter component of FIG. 9, according to aspects of the present disclosure.

As shown in FIG. 13, the attachment member 112 defines a semi-circular slot 140 and an aperture 141 formed through the attachment member 112. The semi-circular slot 140 of the attachment member 112 is configured to engage the adapter component 104 to the first shaft 118 as shown in FIGS. 7 and 8. When the aperture 141 of the attachment member 112 is aligned with the aperture 143 of the upper clamp member 110 and the aperture (not shown) defined by the first base plate 134 the securing member 136 may be inserted through the aligned apertures to couple the attachment member 112 to the upper clamp member 110 and the first base plate 134 of the drill attachment 100.

Referring back to FIGS. 9-13, in some embodiments the lower clamp member 111 defines an attachment portion 148 configured to be attached to the middle portion 151 of the upper clamp member 110 through a securing member 113, such as a wing nut, when coupling the lower clamp member 111 to the upper clamp member 110. In addition, the lower clamp member 111 defines a first angled portion 149 and a second angled portion 150 that collectively form a channel 121 (FIG. 9) with the curved portion 152 of the upper clamp member 110 when the upper clamp member 110 is coupled to the lower clamp member 111. As shown in FIG. 1, the upper and lower clamp members 110 and 111 of the adapter component 104 are configured to engage securely around the handle 14 of the drill apparatus 10 such that the drill trigger 16 may be actuated by the drill attachment 100 as shall be described in greater detail below. As further shown, the middle portion 151 of the upper clamp member 110 defines an elongated slot 142 that is aligned with the slot 144 of the lower clamp member 111 when coupling the upper clamp member 110 to the lower clamp member 111 with securing member 134.

Figure 3:
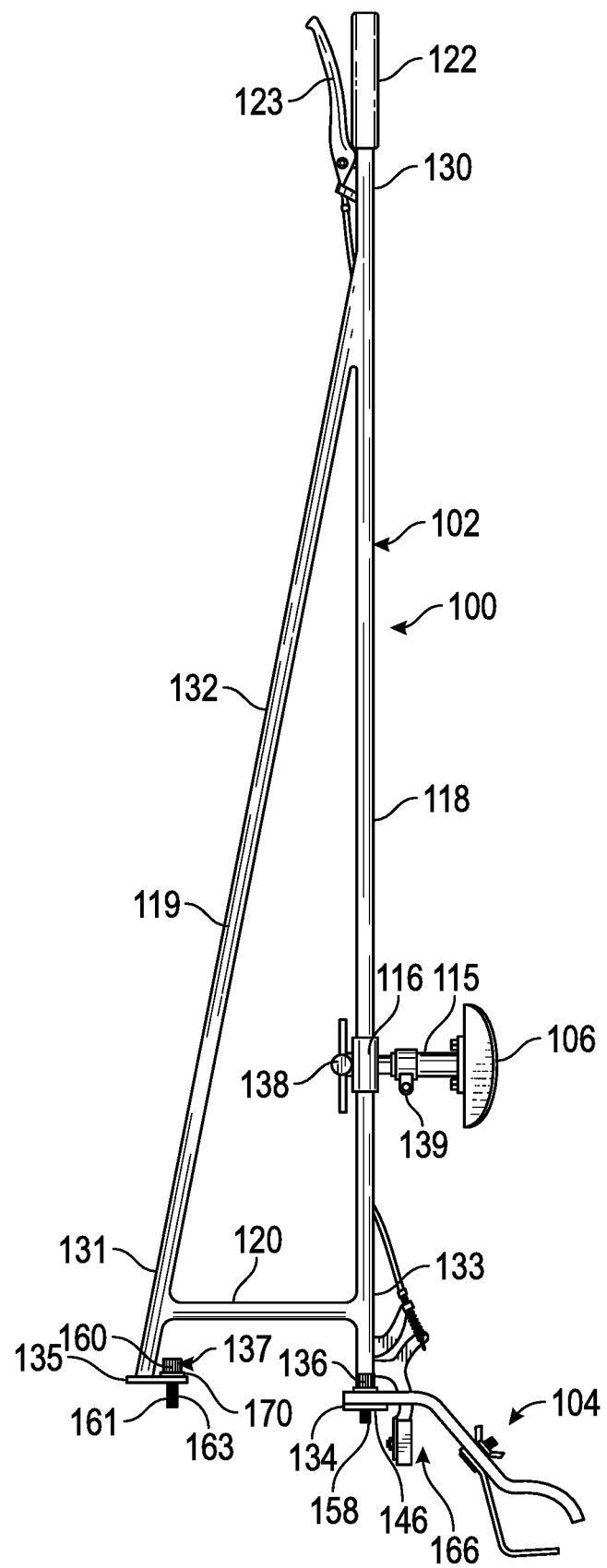
FIG. 3 is a side view of the drill attachment of FIG. 1, according to aspects of the present disclosure.
Figure 4:
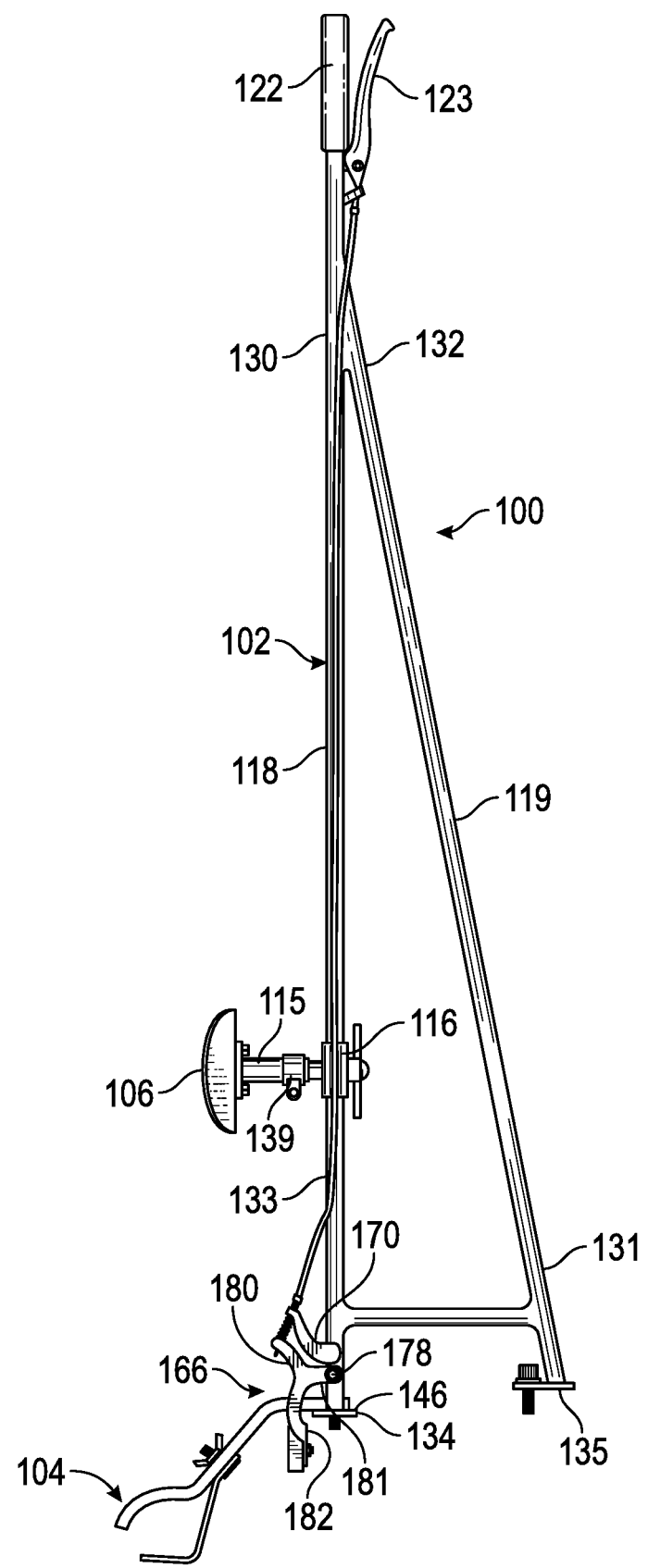
FIG. 4 is an opposite side view of the drill attachment of FIG. 3, according to aspects of the present disclosure.
Figure 5:
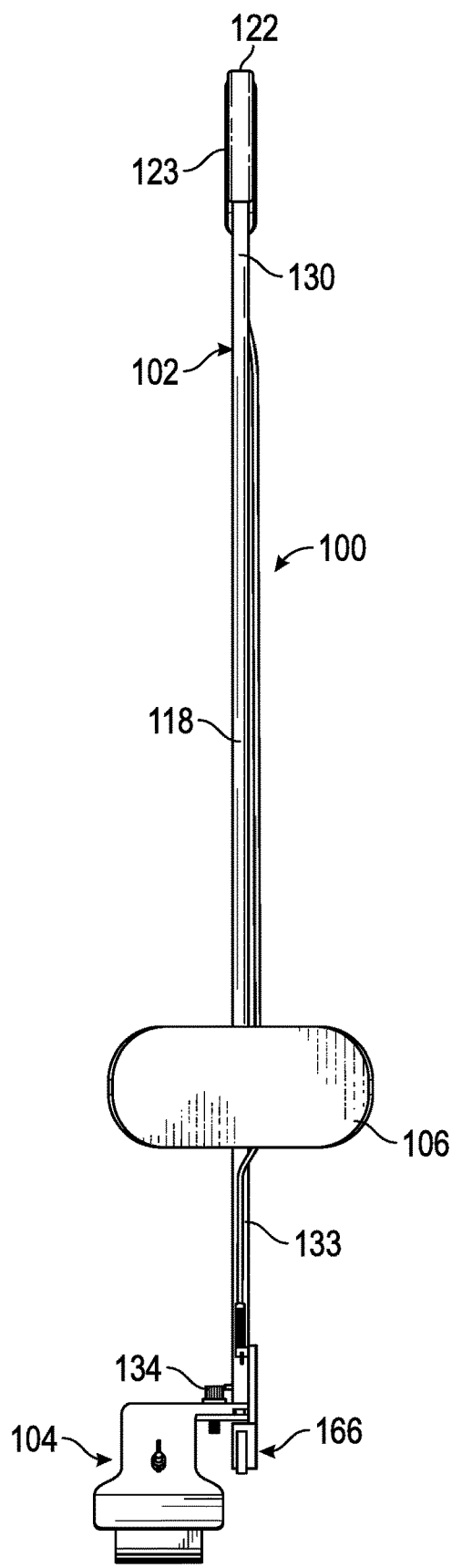
FIG. 5 is a front view of the drill attachment of FIG. 3, according to aspects of the present disclosure.
Figure 6:
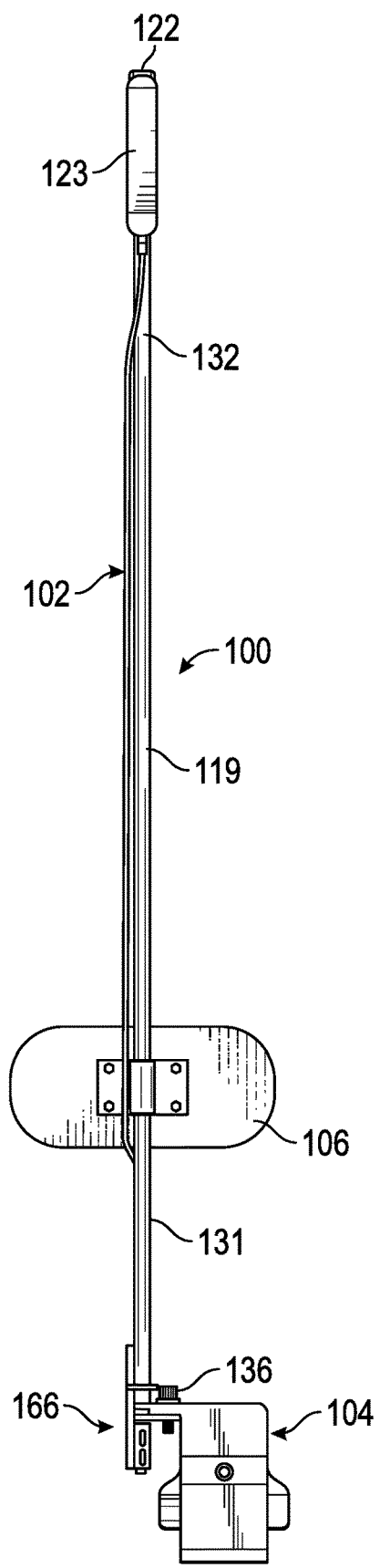
FIG. 6 is a rear view of the drill attachment of FIG. 3, according to aspects of the present disclosure.

As shown in FIGS. 1 and 3, the second shaft 119 of the drill attachment 100 may include a second base plate 135 defining a planar surface 170 (FIG. 3) configured to engage the proximal shaft portion 133 of the second shaft 119 to the engagement point 24 formed by the drill apparatus 10. As noted above, the engagement point 24 defines internal threads configured to engage a securing member 137 having a cap portion 160 and an axial rod portion 161 defining external threads 163 configured to engage the internal threads of the engagement point 24. The cap portion 160 of the securing member 137 is configured to be manually rotated by the user when coupling the second base plate 135 to engagement point 24 the drill apparatus 10, while the axial rod portion 157 of the securing member 137 is configured to be inserted through the aperture (not shown) defined through the second base plate 137 and engaged within the engagement point 24 of the drill apparatus 10 such that rotation of the cap portion 160 causes the external threads 163 of the securing member 137 to engage the second base plate 135 of the drill attachment 100 to the engagement point 24 of the drill apparatus 10.

Figure 15:
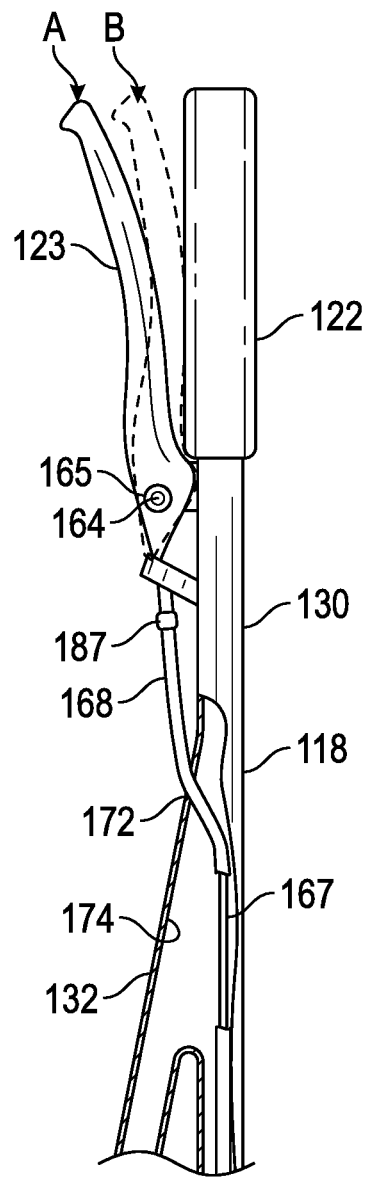
FIG. 15 is a partial cross sectional side view of the drill attachment showing the actuation of a handle for the drill attachment, according to aspects of the present disclosure.

Referring to FIGS. 1-6, 15 and 16, the drill attachment 100 includes an actuating handle 123 secured to the proximal shaft portion 130 of first shaft 118 to provide a means of actuating the drill apparatus 10 using the pivot action of the actuating handle 123 to actuate the drill trigger 16. As shown in FIG. 15, the actuating handle 123 is pivotally engaged along the proximal shaft portion 130 at a first pivot point 164. A screw 165 engages the actuating handle 123 at first pivot point 164 such that the actuating handle 123 may be pivoted between a position A wherein the actuating handle 123 is unbiased and does not actuate the drill trigger 16 and a position B (shown in phantom) wherein the individual pulls the actuating handle 123 back toward the grip 122 to actuate the drill trigger 16 and then allowing the actuating handle 14 to be biased back to a resting position A in order to terminate operation of the drill apparatus 10.

Figure 16:
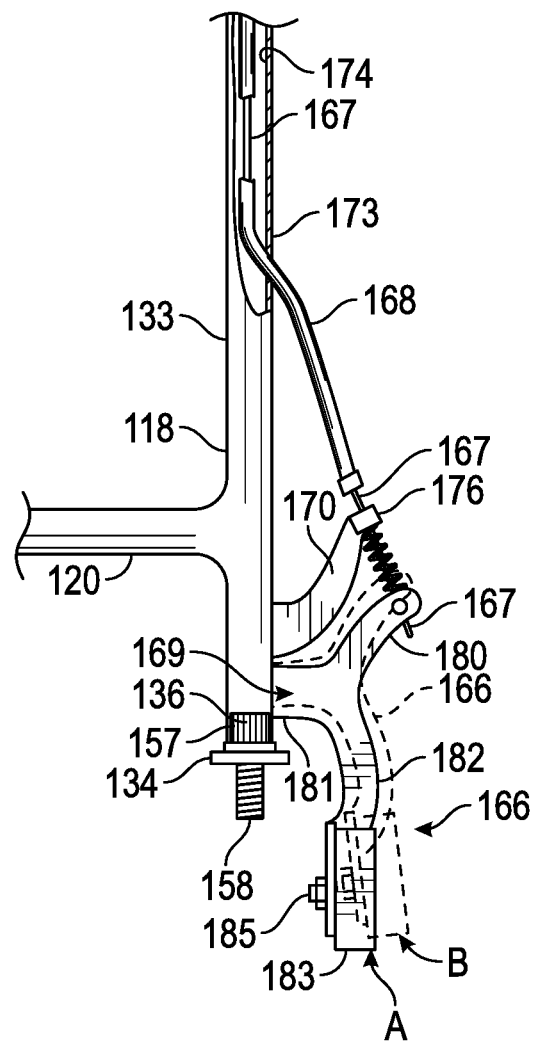
FIG. 16 is a partial cross sectional side view of the drill attachment showing the actuation of the trigger actuator by the handle shown in FIG. 15, according to aspects of the present disclosure.
Figure 17:
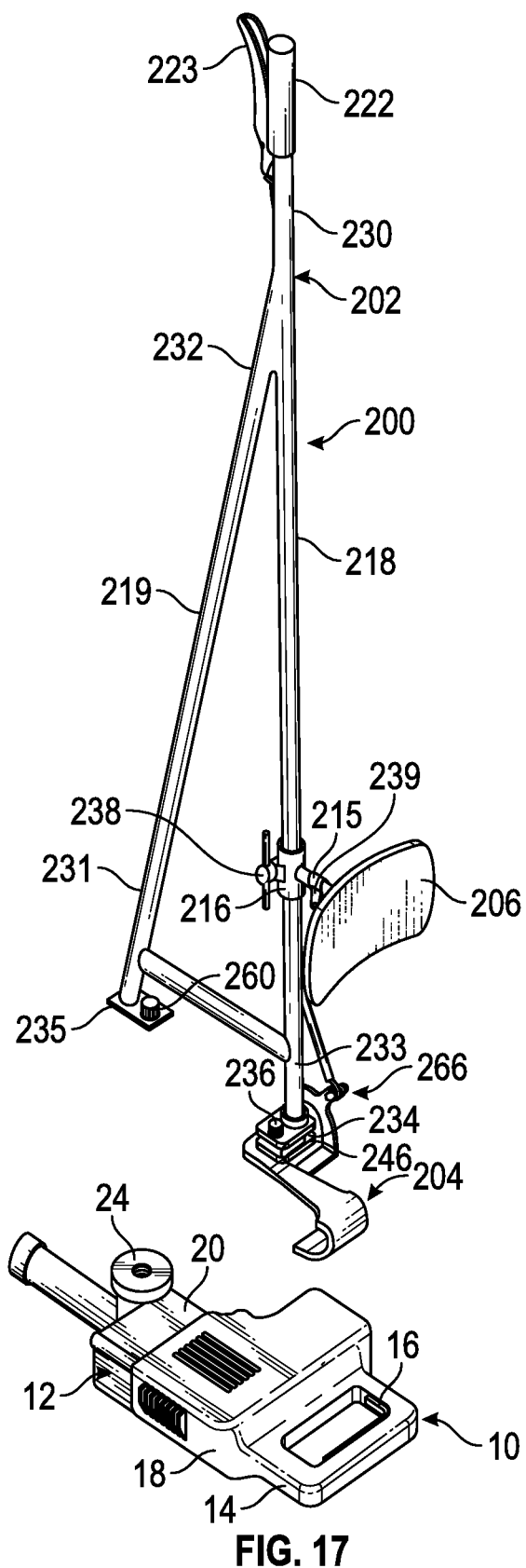
FIG. 17 is a perspective view of a second embodiment of the drill attachment showing another embodiment of an adapter component disengaged from the drill apparatus, according to aspects of the present disclosure.

As further shown in FIGS. 15 and 16, the actuating handle 123 is operatively engaged to a trigger actuator 166 through a trigger cable 167 slidably enclosed in a cable sheath 168 that provides a protective covering to the trigger cable 167. In one embodiment, the trigger cable 167 may be made from a metal wire having one end engaged to the actuating handle 123 and an opposite end operatively engaged to the trigger actuator 166 such that the action of the trigger cable 167 actuates or terminates actuation of the drill trigger 16. A first stationary arm 170 extends from the first shaft 118 and engages the trigger cable 167 proximate the actuating handle 123.

In one embodiment, the cable sheath 168 may be disposed within the hollow construction of the bifurcated frame 102. The cable sheath 168 may enter a first opening 172 (FIG. 15) defined along the proximal shaft portion 130 of first shaft 118. The first opening 172 communicates with a second opening 173 (FIG. 16) defined at the distal shaft portion 131 of the first shaft 118 through a conduit 174 formed along the bifurcated frame 102. As such, a substantial portion of the cable sheath 168 may be disposed inside the bifurcated frame 102. In the alternative, a metal rod (not shown) may be substituted for the trigger cable 167 which may be operatively engaged between the actuating handle 123 and the trigger actuator 166 that is disposed outside the bifurcated frame 102 in order to provide a means for actuating the trigger actuator 166 upon operation of the actuator handle 123.

The trigger actuator 166 includes the stationary arm 170 secured to the distal shaft portion 131 of the first shaft 118 which is adapted to engage the trigger cable 167. The trigger actuator 166 may further include a rocking arm 169 that pivots about a second pivot point 178 (FIG. 14) defined along the distal shaft portion 133 of the first shaft 118 between positions A and B as illustrated in FIG. 16. In this embodiment, position A depicts the trigger actuator 166 in the disengaged position relative to drill trigger 16, while position B depicts the trigger actuator 166 in the engaged position relative to drill trigger 16. The rocking arm 169 of the drill trigger 16 permits selective operation of the drill apparatus 10 when pivoted by operation of the actuator handle 14 such that the drill trigger 16 is either engaged (position B) or disengaged (position A).

Figure 14:
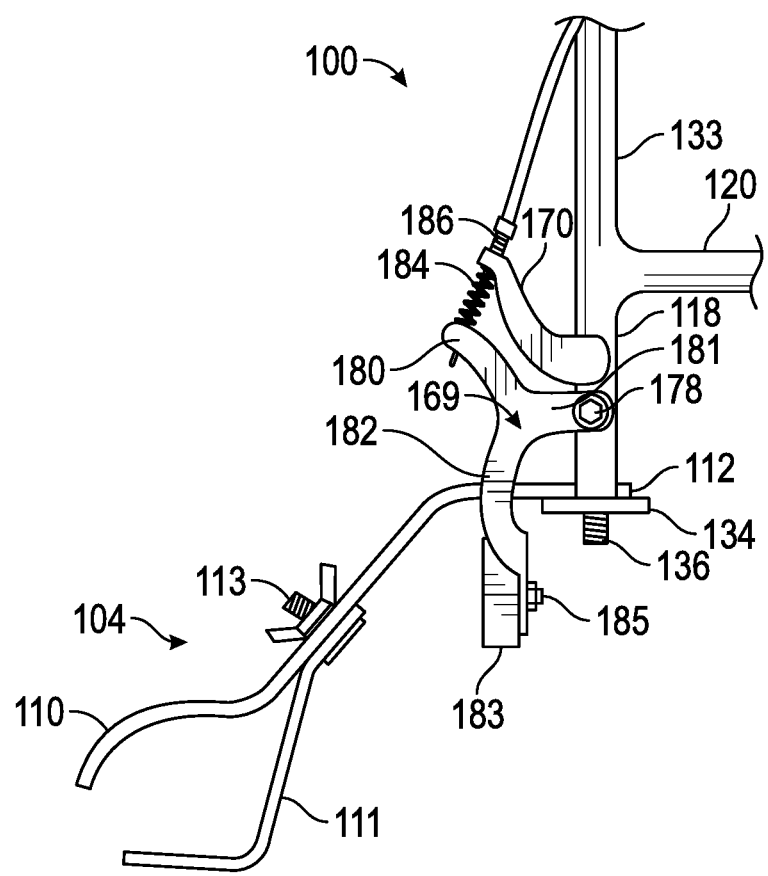
FIG. 14 is an enlarged side view of a trigger actuator and adapter component for the drill attachment, according to aspects of the present disclosure.

As shown in FIGS. 14 and 16, the rocking arm 169 defines a retaining arm 180 that is operatively engaged to the terminal end of the trigger cable 167, a pivoting arm 181 that pivots about second pivot point 178 when actuated by the actuator handle 14, and an actuating arm 182 defining a slot (not shown) having an actuating pad 183 that is adapted to engage or disengage the drill trigger 16 when the rocking arm 169 is pivoted by the action of the trigger cable 167. Referring to FIG. 14, in one embodiment a bolt and nut arrangement 185 may be used to secure and adjust the actuating pad 183 along the slot of the actuating arm 182.

In addition, a tightening nut 186 may be operatively engaged to the trigger cable 167 proximate the trigger actuator 166 such that rotation of the tightening nut 186 causes the trigger cable 167 to be lengthened or shortened in order to loosen or tighten the trigger cable 167 relative to the trigger actuator 166. Another tightening nut 187 may be operatively engaged to the trigger cable 167 proximate the actuator handle 123 in order to also adjust the length of the trigger cable 167 in a similar manner.

The trigger cable 167 may be operatively engaged between the stationary arm 170 and the retaining arm 180 such that actuation of the actuator handle 123 allows the trigger cable 167 to lift the retaining arm 180 by the pulling action of the trigger cable 167 which causes the rocking arm 169 to pivot. This pivoting action of the rocking arm 169 around the second pivot point 178 causes the actuation arm 182 to move between position A and position B in order to engage and disengage the drill trigger 16 and operate the drill apparatus 10. A spring 184 may be provided between the stationary arm 170 and the rocking arm 169 for providing a biasing action such that release of the actuator handle 123 causes the rocking arm 169 to be biased back to position A which disengages the actuating pad 183 from the drill trigger 16 and terminates operation of drill apparatus 10. In one embodiment, the trigger cable 167 may be disposed within the coiled lumen of the spring 184.

Referring to FIGS. 1-6, in an embodiment the drill attachment 100 may further include a knee pad 106 which is engaged to the first shaft 118 through a lateral knee pad arm 115. The lateral knee pad arm 115 may include an adjustable sleeve 116 in operative engagement with a fastening mechanism 138 to adjust the height of the lateral knee pad arm 115 relative to first shaft 118. In addition, a secondary adjustable sleeve 139 may be provided along the lateral knee pad arm 115 for adjusting the distance of the knee pad 106 relative to the first shaft 118. The knee pad 106 may provide a soft contact surface for use by the operator to engage with the user's knee in order to apply a force against the drill apparatus 10 when abutting the drill apparatus 10 against a concrete slab or other drill apparatus surface when the user is in a substantially upright position.

As noted above, the adapter component 104 is used to couple the drill attachment 100 to various types of drill apparatuses 10, especially those drill apparatuses 10 that lack a second engagement point configured to secure the first shaft 118 to the drill apparatus 10. Once the drill attachment 100 is secured to the drill apparatus 10 in the manner described above, the individual may operate the drill attachment 100 by gripping the actuator handle 123 and grip 122 with one hand and the second shaft 119 with the other hand. As noted above, the individual may engage the knee pad 106 with the individual's knee in order to apply a lateral force to the drill apparatus 10 through the drill attachment 100. The individual may then squeeze the actuator handle 123 which pivots the rocking arm 169 from position A to position B and causes the drill trigger 16 to be engaged by the actuating arm 182 until the user releases the actuator handle 123 which is biased back to position A.

In one embodiment, the first shaft 118, second shaft 119, support shaft 120 may be welded together, although other methods of attachment are contemplated, such as using a bolt and screw combination, or other mechanical arrangement to assemble and secure the bifurcated assembly 102.

Referring to FIGS. 17-27, a second embodiment of the drill attachment, designated 200, may be adapted to be operatively engaged to the drill apparatus 10 having body 12 defining proximal portion 18 forming a handle 14 and a distal portion 20 defining an engagement point 24 for engaging for drill apparatus 10 to the drill attachment 200. Similarly, the handle 14 also includes a trigger 16 that is remotely actuated by the drill attachment 200 such that the user does not have to directly actuate the drill trigger 16 to operate the drill apparatus 10. In some embodiments the engagement point 24 defines a threaded hole defined through the body 12 of the drill apparatus 10 which is adapted for use in engaging a removable lateral handle (not shown) used by an individual in directly handling the drill apparatus 10 when not engaged to the drill attachment 100. In some embodiments, the handle 14 includes a drill trigger 16 that may be actuated by the drill attachment 200 such that the user does not have to directly actuate the drill trigger 16 to operate the drill apparatus 10. In some embodiments, the handle 14 is configured for engagement with an adapter component 204 for operatively coupling the drill attachment 200 to the drill apparatus 10 regardless of the configuration of the handle 14.

Referring to FIGS. 17-22, in some embodiments the drill attachment 200 may include a bifurcated frame 202 having an elongated, hollow tubular first shaft 218 and an elongated, hollow tubular second shaft 219. As shown, the first shaft 218 defines a proximal shaft portion 230 adapted for handling and actuating the drill attachment 200 and a distal shaft portion 233 configured for physically coupling the adapter component 204 to the handle 14 of the drill apparatus 10 when securing the drill attachment 200 to the drill apparatus 10 as shall be described in greater detail below. In one embodiment, the proximal shaft portion 230 of the first shaft 218 may include a grip 222 made of plastic or rubber material adapted for handling by the individual when operating the drill attachment 200.

As further shown, the second shaft 219 defines a proximal shaft portion 232 that extends from the proximal shaft portion 230 of the first shaft 218 at a set angle relative to the first shaft 218. In addition, the second shaft 219 defines a distal shaft portion 231 adapted to engage and secure the drill attachment 200 to the engagement point 24 formed along the drill apparatus 10. In addition, a support shaft 220 (FIG. 18) may be laterally interposed between the first shaft 218 and second shaft 219 to provide structural support and reinforcement for the bifurcated frame 202. As noted above, the first shaft 218 and second shaft 219 are adapted to engage the drill attachment 200 to the distal portion 20 and proximal portion 18 of the drill apparatus 10, respectively.

In some embodiments, the second shaft 219 of the drill attachment 200 may include a base plate 235 (FIG. 19) defining a planar surface 270 (FIG. 20) configured to engage the proximal shaft portion 231 of the second shaft 219 to the engagement point 24 formed by the drill apparatus 10. As shown in FIG. 20, the engagement point 24 defines internal threads configured to engage a securing member 237 having a cap portion 260 and an axial rod portion 261 defining external threads 263 configured to engage the internal threads of the engagement point 24. The cap portion 260 of the securing member 237 is configured to be manually rotated by the user when coupling the base plate 235 to engagement point 24 the drill apparatus 10, while the axial rod portion 261 of the securing member 237 is configured to be inserted through the aperture (not shown) defined through the base plate 235 and engaged within the engagement point 24 of the drill apparatus 10 such that rotation of the cap portion 260 causes the external threads 263 of the securing member 237 to engage the base plate 235 of the drill attachment 200 to the engagement point 24 of the drill apparatus 10.

Figure 18:
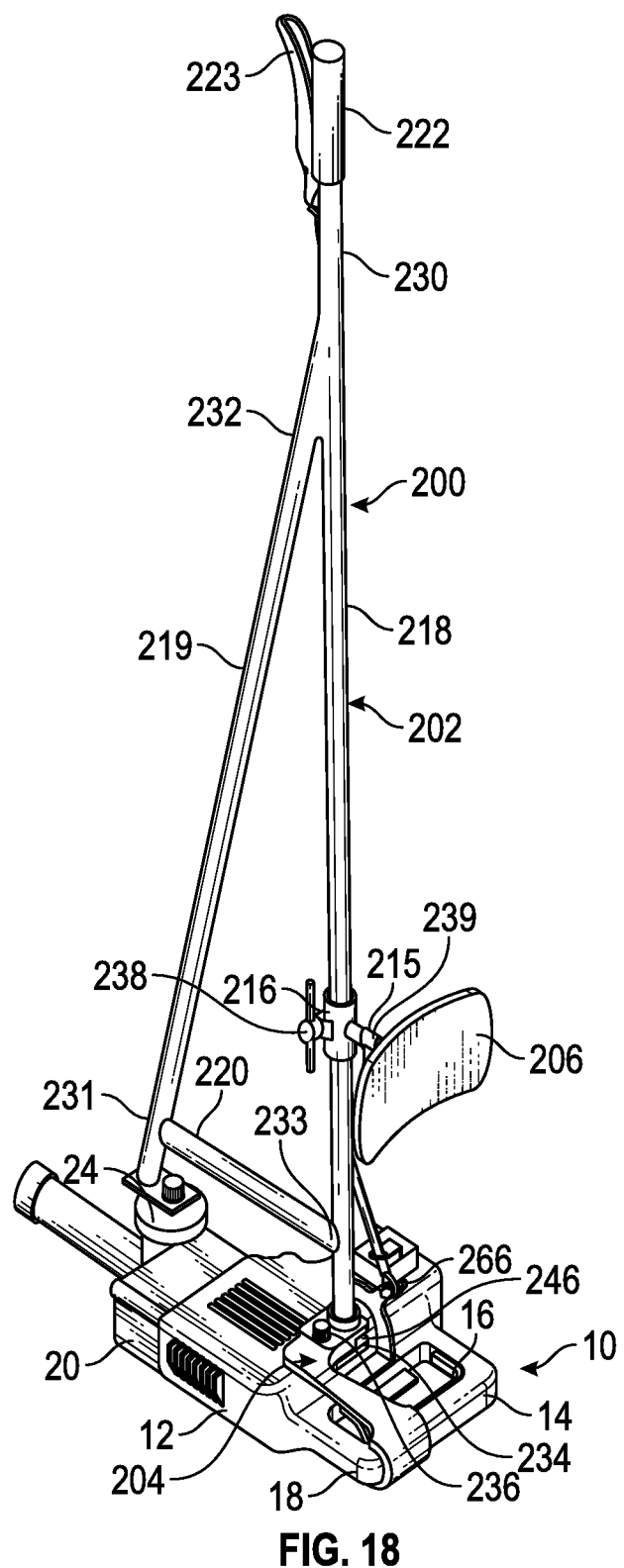
FIG. 18 is a perspective view of the drill attachment of FIG. 17 showing the adapter component engaged to the drill apparatus, according to aspects of the present disclosure.
Figure 19:
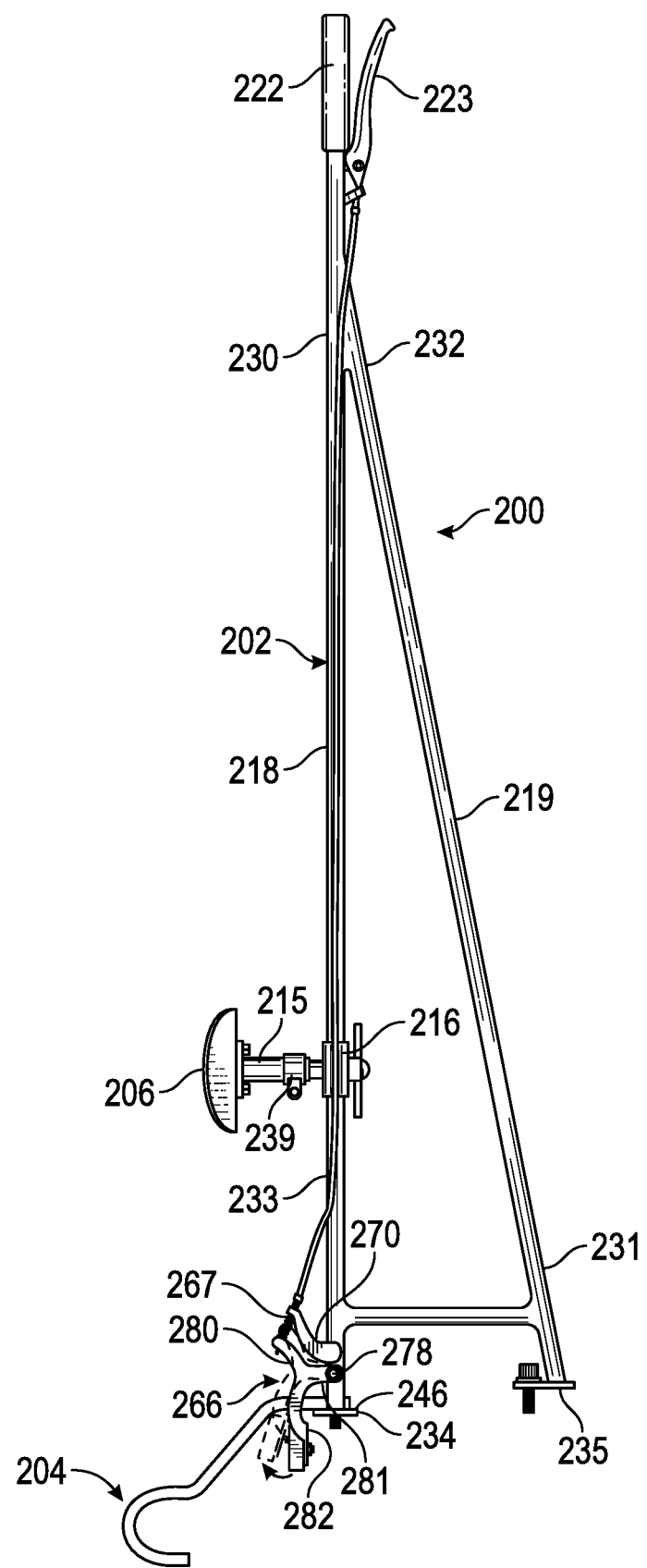
FIG. 19 is a side view of the drill attachment of FIG. 17, according to aspects of the present disclosure.
Figure 20:
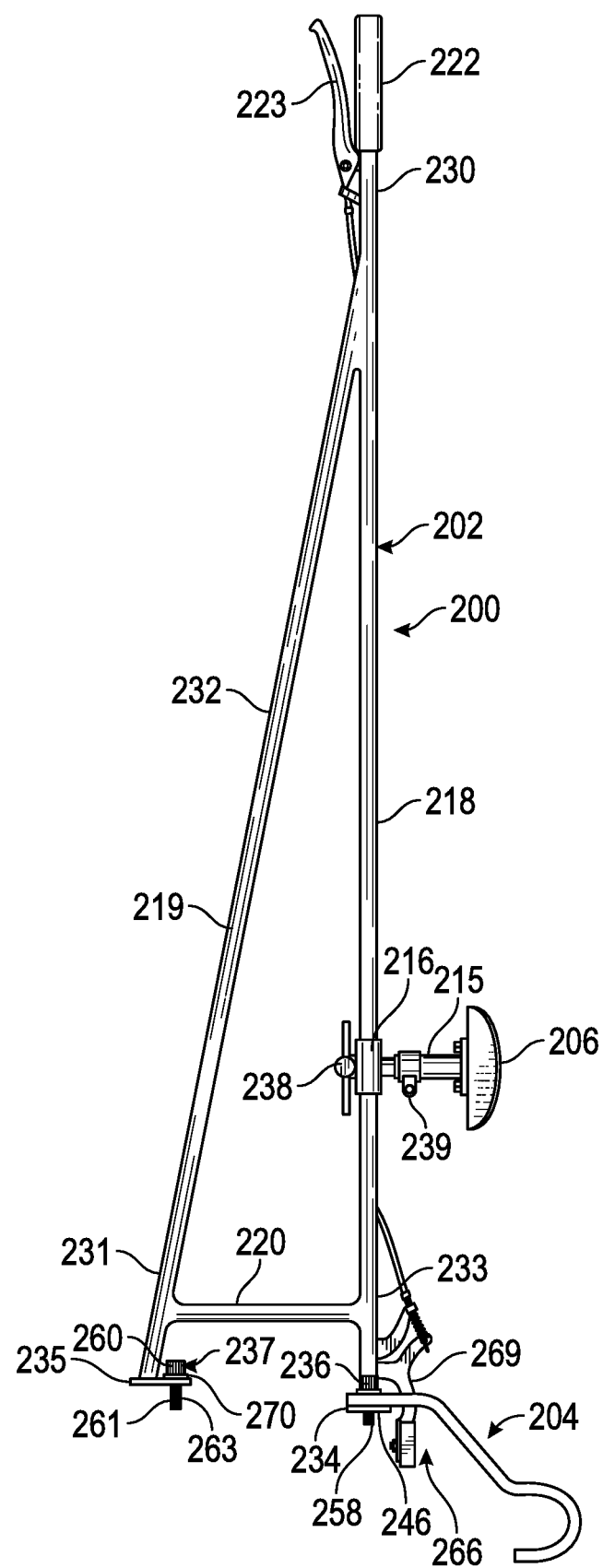
FIG. 20 is an opposite side view of the drill attachment of FIG. 17, according to aspects of the present disclosure.
Figure 21:
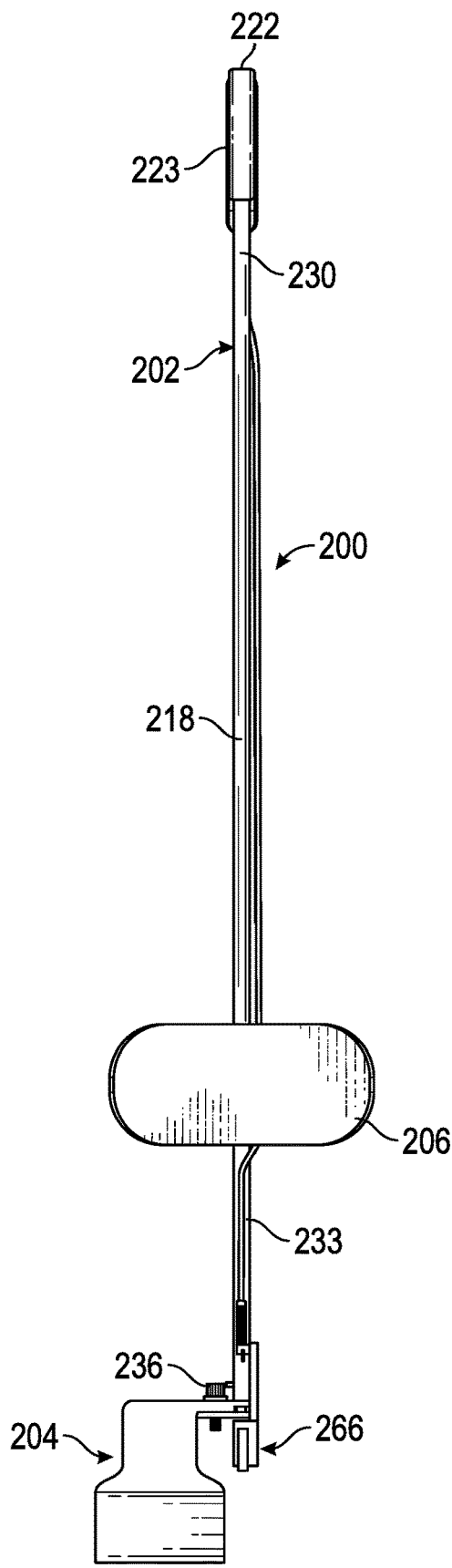
FIG. 21 is a front view of the drill attachment of FIG. 17, according to aspects of the present disclosure.
Figure 22:
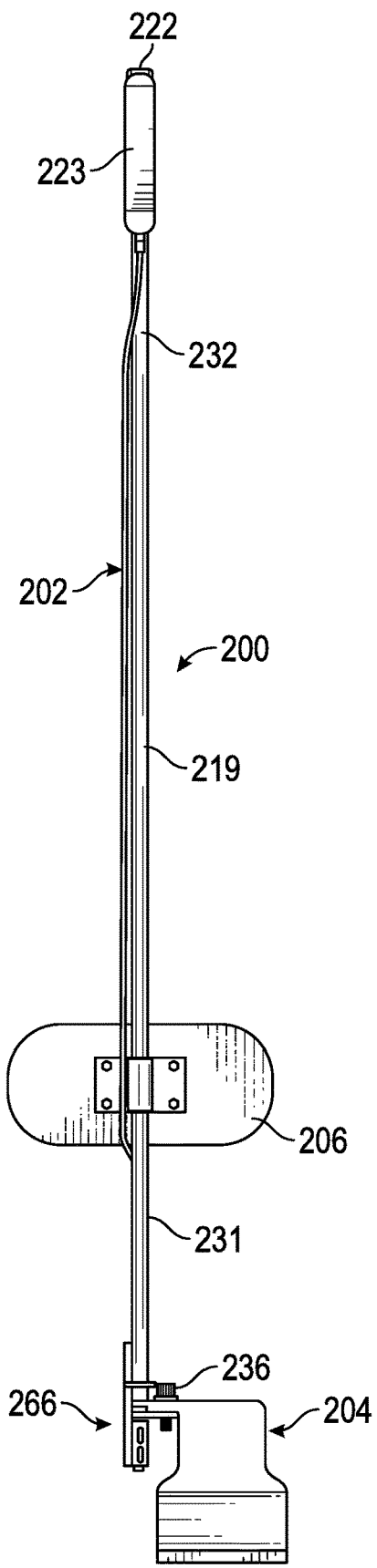
FIG. 22 is a rear view of the drill attachment of FIG. 17, according to aspects of the present disclosure.

Referring to FIGS. 18-22, similar to drill attachment 100, the drill attachment 200 includes an actuating handle 223 secured to the proximal shaft portion 230 of first shaft 218 to provide a means of actuating the drill apparatus 10 using the pivot action of the actuating handle 223 to actuate the drill trigger 16 as described above in relation to drill attachment 100. As shown in FIG. 19, the actuating handle 223 is pivotally engaged along the proximal shaft portion 230 such that the actuating handle 223 may be pivoted between a resting position when the actuating handle 223 is unbiased and not actuating the drill trigger 16 and a biased position wherein the individual pulls the actuating handle 223 back toward the grip 222 to actuate the drill trigger 16 and then allowing the actuating handle 14 to be biased back to a resting position in order to terminate operation of the drill apparatus 10.

As further shown in FIG. 19, the actuating handle 223 is operatively engaged to a trigger actuator 266 through a trigger cable slidably enclosed in a cable sheath that provides a protective covering to the trigger cable. In one embodiment, the trigger cable may be made from a metal wire having one end engaged to the actuating handle 223 and an opposite end operatively engaged to the trigger actuator 266 such that the action of the trigger cable actuates or terminates actuation of the drill trigger 16. A first stationary arm 270 extends from the first shaft 218 and engages the trigger cable proximate the actuating handle 223.

As shown in FIG. 19, the trigger actuator 266 includes the stationary arm 270 secured to the distal shaft portion 233 of the first shaft 218 which is adapted to engage the trigger cable 267. The trigger actuator 266 may further include a rocking arm 269 that pivots about a second pivot point 278 defined along the distal shaft portion 233 of the first shaft 218 between the resting position (shown in solid line) and a biased position (shown in phantom line). In this embodiment, the resting position depicts the trigger actuator 266 in the disengaged position relative to drill trigger 16, while biased position depicts the trigger actuator 266 in the engaged position relative to drill trigger 16. The rocking arm 269 of the drill trigger 16 permits selective operation of the drill apparatus 10 when pivoted by operation of the actuator handle 14 such that the drill trigger 16 is either engaged or disengaged.

As shown in FIGS. 19 and 20, the rocking arm defines a retaining arm 280 that is operatively engaged to the terminal end of the trigger cable 267, a pivoting arm 281 that pivots about second pivot point 278 when actuated by the actuator handle 14, and an actuating arm 282 defining a slot (not shown) having an actuating pad that is adapted to engage or disengage the drill trigger 16 when the rocking arm is pivoted by the action of the trigger cable.

As shown in FIGS. 17-22, in some embodiments the first shaft 218 of the drill attachment 200 may include a base plate 234 configured to engage the adapter component 204 to the handle 14 of the drill apparatus 10 when engaging the drill attachment 200 to the drill apparatus 10. In particular, as shown in FIG. 18 the base plate 234 defines a planar surface 246 forming an aperture (not shown) configured to engage the adapter component 204 to the first shaft 218 of the bifurcated frame 202 using a securing member 236. As shown, the adapter component 204 is configured to permit universal engagement of the drill attachment 200 to any type of drill apparatus 10, while allowing the remote actuation of the drill apparatus 10 by the operation of the drill attachment 200 as the user maintains a substantially upright position.

Figure 26:
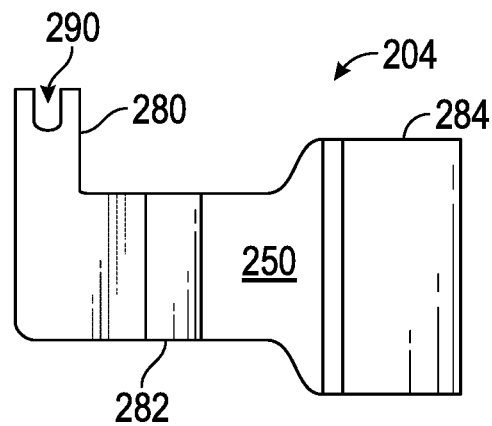
FIG. 26 is a an top view of the adapter component of FIG. 23.
Figure 27:
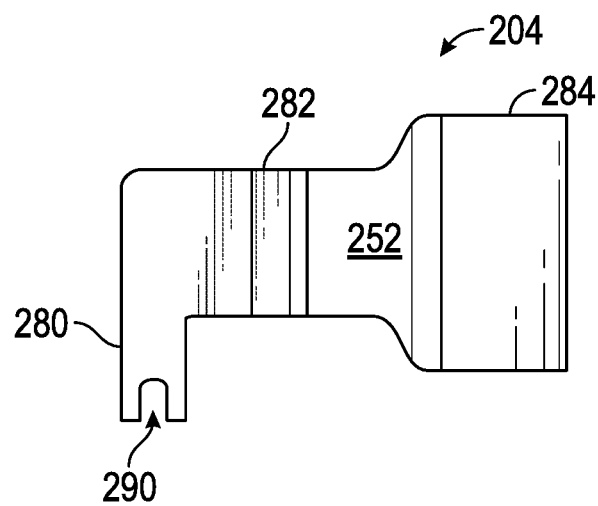
FIG. 27 is a bottom view of the adapter component of FIG. 23.

Referring to FIGS. 23-27, in some embodiments the adapter component 204 defines an upper surface 250 and an opposite lower surface 252 that collectively define a proximal portion 280, a middle portion 282 and a distal portion 284 of the adapter component 204. As shown in FIGS. 26 and 27, the proximal portion 280 defines an open slot 290 configured to engage and orient the distal portion 231 of the first shaft 218 in similar fashion as illustrated in FIG. 7.

Figure 23:
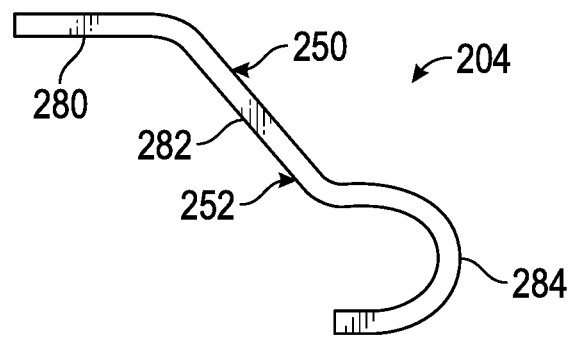
FIG. 23 is a side view of the adapter component of FIG. 17, according to aspects of the present disclosure.
Figure 24:
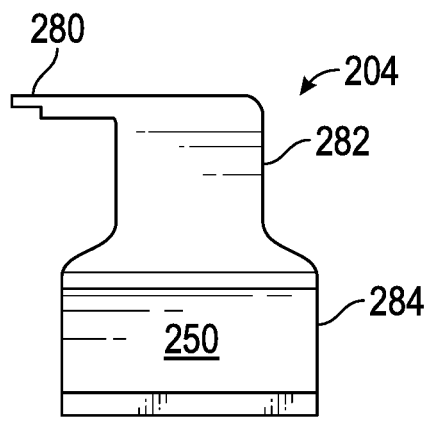
FIG. 24 is an end view of the adapter component of FIG. 23.
Figure 25:
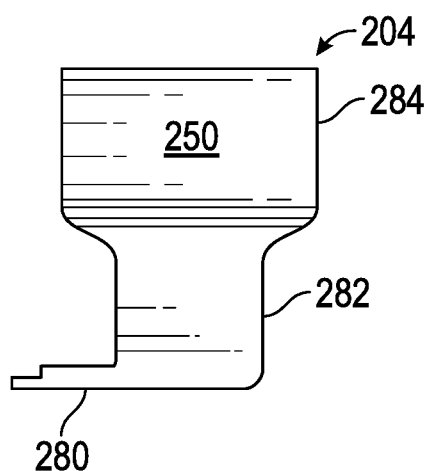
FIG. 25 is an opposite end view of the adapter component of FIG. 23.

Referring to FIG. 23, in some embodiments the distal portion 284 of the adapter component 204 has a curved shape configured to engage around the handle 14 of the drill apparatus 10 in a manner that allows the first shaft 218 of the drill attachment 200 to be adequately secured to the drill apparatus 10. In this fashion, the adapter component 204 allows the drill attachment 200 to be operatively engaged to any type of conventional drill apparatus 10.

As shown in FIGS. 26 and 27, the proximal portion 280 of the adapter component 204 defines open slot 290 configured to engage the adapter component 204 to the first shaft 218 of the drill attachment 200. In addition, the proximal portion 280 of the adapter component 204 defines an aperture 241 proximate the open slot 290 which is configured to receive securing member 236 that secures the adapter component 204 to the base plate 234 of the drill attachment 200.

In some embodiments, the middle portion 282 of the adapter component 204 may be oriented at a 45 degree angle relative to the proximal portion 280 and the distal portion 284. In some embodiments, the middle portion 282 may be angled in a range between 35 degrees to 55 degrees relative to the proximal portion 280 and distal portion 284.

Figure 28:
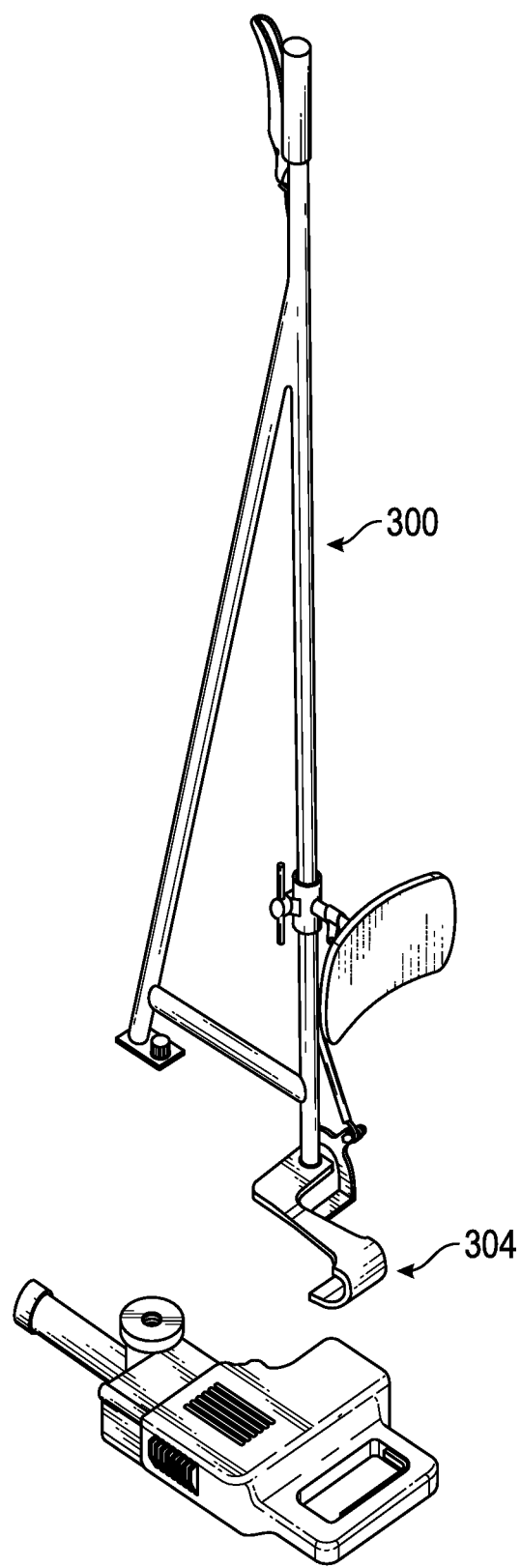
FIG. 28 is a perspective view of the drill attachment showing the adapter component being integral with the drill attachment.

Referring to FIG. 28, a third embodiment of the drill apparatus, designated 300, is shown in which the adapter component 304, similar in construction to adapter component 204, is made integral with the shaft of the drill attachment 300 rather than being coupled and secured to the drill attachment 300 as in previous embodiment described herein.

In another embodiment, the drill attachments 100, 200 and 300 may be operatively engaged with a cordless drill or a corded drill. In addition, the drill attachments 100, 200 and 300 may be operatively engaged to the aforementioned types of drills in order to auger holes in wood, masonry, or concrete either at grade or overhead levels.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A drill attachment configured to be coupled to a drill apparatus, the drill apparatus having a drill handle with a trigger for actuating the drill apparatus, the drill attachment comprising:
    a bifurcated frame defining a first shaft and a second shaft, the first shaft defining a proximal shaft portion and distal shaft portion with a base plate defined along a terminal end of the distal shaft portion,
    a handle pivotally engaged to the proximal shaft portion of the first shaft, the handle being operatively engaged with a trigger cable;
    an adapter component engaged to the distal shaft portion of the first shaft, the adapter component comprising:
        an upper clamp member defining an attachment member; and
        a lower clamp member coupled to the upper clamp member, the upper clamp member and the lower clamp member collectively defining a channel, the upper clamp member and the lower clamp member being engaged to the handle of the drill apparatus such that the handle of the drill apparatus is disposed within the channel formed by the adapter component,
        wherein the attachment member is secured to the base plate of the first shaft; and
    a trigger actuator coupled to the trigger cable at the distal shaft portion of the first shaft, the trigger actuator having a rocking arm that pivots on the first shaft and is coupled to the trigger cable, and a lateral knee pad arm engaged to said first shaft such that the first shaft of the bifurcated frame is perpendicular to a longitudinal axis of the drill apparatus engaged to the drill attachment and the lateral knee pad arm is parallel to the longitudinal axis of the drill apparatus.

2. The drill attachment according to claim 1, wherein the attachment member of the adapter component further comprises:
    a semi-circular slot defined proximate to the distal shaft portion of the first shaft.

3. The drill attachment according to claim 1, wherein the attachment member is oriented at a perpendicular angle relative to the upper clamp member.

4. The drill attachment according to claim 1, wherein the upper clamp member defines an angled attachment portion coupled to the attachment member, a middle portion in communication with the angled attachment portion, and a curved portion formed adjacent the middle portion and opposite the angled attachment portion, wherein the curved portion defines a curved configuration.

5. The drill attachment according to claim 4, wherein the lower clamp member defines an attachment portion coupled to the upper clamp member, a first angled portion in communication with the attachment portion, and a second angled portion formed adjacent the first angled portion and opposite the attachment portion.

6. The drill attachment according to claim 1, wherein the upper clamp member defines a first slot and the lower clamp member defines a second slot that is aligned with the first slot when the upper clamp member is engaged to the lower clamp member, wherein the aligned first and second slots are configured to receive a securing member.

7. The drill attachment according to claim 1, wherein the base plate defines a planar surface engaged with the attachment member.

8. A drill attachment comprising:
    a bifurcated frame defining a first shaft and a second shaft, the first shaft defining a proximal shaft portion and a distal shaft portion and the second shaft defining a distal shaft portion, and a handle pivotally engaged to the proximal shaft portion; and
    an adapter component engaged to the distal shaft portion of the first shaft, the adapter component comprising:

an upper clamp member including an attachment member coupled to the distal shaft portion of the first shaft, a free end, and an angled attachment portion defined between the free end and the attachment member; and a lower clamp member coupled to the upper clamp member, the upper clamp member and the lower clamp member collectively defining a channel, the upper clamp member and the lower clamp member configured for engagement with a handle of a drill apparatus such that the handle of the drill apparatus is disposed within the channel formed by the adapter component, wherein the attachment member further comprises a semi-circular slot configured to be engaged to the distal shaft portion of the first shaft.

9. The drill attachment according to claim 8, wherein the angled attachment portion is oriented at a perpendicular angle relative to the attachment member of the upper clamp member.

10. The drill attachment according to claim 8, wherein the upper clamp member defines a middle portion in communication with the angled attachment portion, and a curved portion formed adjacent the middle portion and opposite the angled attachment portion, wherein the curved portion defines a curved configuration.

11. A drill attachment comprising:

a bifurcated frame defining a first shaft and a second shaft, the first shaft defining a proximal shaft portion and a distal shaft portion and the second shaft defining a distal shaft portion, and a handle pivotally engaged to the proximal shaft portion; and an adapter component engaged to the distal shaft portion of the first shaft, the adapter component comprising:

an upper clamp member including an attachment member coupled to the distal shaft portion of the first shaft, a free end, and an angled attachment portion defined between the free end and the attachment member; and a lower clamp member coupled to the upper clamp member, the upper clamp member and the lower clamp member collectively defining a channel, the upper clamp member and the lower clamp member configured for engagement with a handle of a drill apparatus such that the handle of the drill apparatus is disposed within the channel formed by the adapter component, wherein the upper clamp member defines a first slot and the lower clamp member defines a second slot that is aligned with the first slot when the upper clamp member is engaged to the lower clamp member, wherein the aligned first and second slots are configured to receive a securing member.

12. A method of making a drill apparatus comprising:

providing a drill apparatus having a drill trigger and a body defining a proximal portion and a distal portion, the distal portion defining an engagement point and the proximal portion defining a handle;

providing a drill attachment having a bifurcated frame defining a first shaft and a second shaft, the first shaft defining a proximal shaft portion and distal shaft portion, a handle pivotally engaged to the proximal shaft portion of the first shaft, the handle being coupled to a trigger cable, and a trigger actuator coupled to the trigger cable at the distal shaft portion of the first shaft, the trigger actuator having a rocking arm that pivots on the first shaft and is coupled to the trigger cable, wherein the rocking arm includes a retaining arm, wherein the trigger actuator further includes a stationary arm secured to the distal shaft portion of said first shaft, the stationary arm being coupled to the trigger cable, the drill attachment further including a spring including a first end and a second end, the first end coupled to the stationary arm and the second end of the spring being coupled to the retaining arm of the rocking arm, the spring applying a biasing force from the spring to the rocking arm; and providing an adaptor component including an upper clamp member and a lower clamp member, the upper clamp member including an attachment member; and coupling the adaptor component with the drill attachment and the drill apparatus, including:

securing the attachment member of the adaptor component to the distal shaft portion of the first shaft of the bifurcated frame of the drill attachment, and engaging one portion of the upper clamp member to the handle of the drill apparatus.

13. The method according to claim 12, further comprising:

attaching an attachment member of the adaptor component defining a semi-circular slot to the first shaft.

14. The method according to claim 12, wherein the upper clamp member defines a first slot and the lower clamp member defines a second slot, and wherein engaging the upper clamp member to the lower clamp member further comprises aligning the first slot with the second slot and then inserting a securing member through the aligned first and second slots to couple the upper clamp member and the lower clamp member.

\* \* \* \* \*